United States Patent [19]

Ruiz Busquets

[11] Patent Number: 5,749,445
[45] Date of Patent: May 12, 1998

[54] DISK BRAKE WITH IMPROVED RECOIL

[75] Inventor: Josep Ruiz Busquets, Barcelone, Spain

[73] Assignee: AlliedSignal Europe Services Techniques, Drancey, France

[21] Appl. No.: 387,879
[22] PCT Filed: Dec. 22, 1994
[86] PCT No.: PCT/FR94/01523
  § 371 Date: Feb. 22, 1995
  § 102(e) Date: Feb. 22, 1995
[87] PCT Pub. No.: WO95/18928
  PCT Pub. Date: Jul. 13, 1995

[30] Foreign Application Priority Data

Jan. 7, 1994 [FR] France .................. 94 00125

[51] Int. Cl.⁶ ........................... B16D 55/224
[52] U.S. Cl. ................... 188/73.45; 158/73.44
[58] Field of Search ............... 188/73.44, 73.45

[56] References Cited

U.S. PATENT DOCUMENTS

| | | | |
|---|---|---|---|
| 4,305,483 | 12/1981 | Iveda | 188/73.45 |
| 4,427,096 | 1/1984 | Stoka et al. | 188/73.45 |
| 4,446,948 | 5/1984 | Meliuat | 188/73.45 |

FOREIGN PATENT DOCUMENTS

| | | | |
|---|---|---|---|
| 0151775 | 11/1979 | Japan | 188/73.45 |
| 0224530 | 9/1989 | Japan | 188/73.45 |

Primary Examiner—Matthew C. Graham
Assistant Examiner—Chris Schwartz
Attorney, Agent, or Firm—Leo H. McCormick, Jr.

[57] ABSTRACT

A disk brake for use in a vehicle. The disk brake has a caliper (1) which straddles a disk (2) and a carrier (3) which is fixed to a stationary member on the vehicle. A cylinder (4) secured to the caliper (1) has a bore (4a) which is closed by a piston (50). The carrier (3) has at least one guide pin (6,7) which extends into a blind bore (8,9) in the caliper (1). On communication of hydraulic fluid to bore (4a) the piston (5) and caliper (1) respectively move friction pads (10,11) into engagement with the disk (2) to effect a brake application. The guide pin (6,7) and blind bore (8,9) are defined with respect to the cylinder (4) such on movement of the cylinder by the hydraulic fluid to effect the brake application, air is compressed between the end (6a,7a) of the guide pin (6,7) and the bottom (8p,9p) of the blind bore (8,9). On termination of the brake application, the compressed air expands to move the caliper (1) to a rest position.

1 Claim, 2 Drawing Sheets

DISK BRAKE WITH IMPROVED RECOIL

The present invention relates to a disk brake for a motor vehicle, comprising:

two brake elements which can move one with respect to the other, one of which is a caliper straddling a brake disk, and the other of which is a carrier fixed to the vehicle;

clamping means comprising a cylinder secured to the caliper and exhibiting, facing the disk, an opening closed by a piston;

guide means allowing a sliding of the caliper with respect to the carrier when the clamping means are actuated, these guide means comprising at least one guide pin fixed to one of the brake elements, and a blind bore formed in the other brake element and in which the guide pin slides, this guide pin and this bore respectively constituting first and second guide members exhibiting respective front parts formed by a free end of the guide pin and by the opening of the bore, and respective rear parts formed by a connected end of the guide pin and by the bottom of the bore; an elastically deformable annular sleeve surrounding the opening of the bore and the guide pin; and two friction pads pointing towards opposite faces of the disk, clamped between the piston and the caliper, and applied to the disk when the clamping means are actuated.

Such brakes are well known in the prior art, as shown, for example, by document FR-A-2,353,755, or the equivalent document GB-A-1,572,451.

BACKGROUND OF THE INVENTION

A very old problem which is posed in brakes of this type, termed "sliding caliper" brakes, is that of the return of the caliper to its position of rest after the actuation of the brake.

In effect, contrary to the piston, which is moved directly by the hydraulic brake fluid, the caliper is moved solely by mechanical reaction of the piston on one of the pads which bears on the disk and must, what is more, slide over the guide pin or guide pins in order to return to its initial position, this return therefore being quite tricky.

Under these conditions, it is often the case that the pad facing that face of the disk opposite the one toward which the piston points rubs on the disk even when the brake is not actuated, and wears prematurely while unduly slowing the vehicle.

The invention is located within this context, and its object is to propose a sliding caliper disk brake of simple structure, but one in which the caliper nevertheless returns regularly to its position of rest as soon as the brake is released.

SUMMARY OF THE INVENTION

To this end, the brake of the invention, conforming, moreover, to the abovementioned preamble, is essentially characterized in that the rear part of at least one of the guide members which the caliper carries is further from the bottom of the cylinder than the front part of this guide member, and in that the air capable of escaping from the bore is at least partially contained inside the said sleeve.

Under these conditions, the air trapped in the blind bore and/or in the sleeve and which is expanded by the rise in temperature, which the actuation of the brake produces owing to the friction of the pads on the disk, pushes the caliper back into its position of rest by exerting a force directed along the axis of the guide pin or guide pins.

According to a first possible embodiment of the invention, the guide pin is carried by the caliper and the opening of the bore pierced in the carrier points in the same direction as the opening in the cylinder.

According to a second possible embodiment of the invention, the guide pin is carried by the carrier and the opening of the bore pierced in the caliper points in the opposite direction from that in which the opening in the cylinder points.

Other characteristics and advantages of the invention will emerge clearly from the description thereof which is given hereafter, by way of non-limiting indication, with reference to the appended drawings.

DETAILED DESCRIPTION OF THE INVENTION

Figure 1:
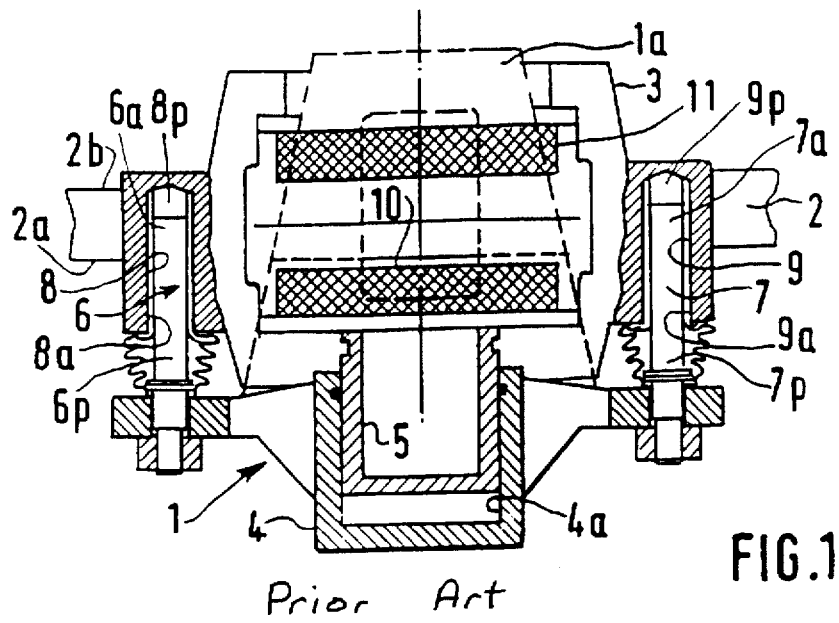
FIG. 1 is a plan and partial section view of a brake, not in accordance with the invention.

As shown in FIG. 1, which illustrates only the general field of the invention, this invention relates to a disk brake for a motor vehicle, this brake being composite or otherwise and comprising:

two brake elements which can move one with respect to the other, one of which is a caliper 1 straddling a brake disk 2, and the other of which is a carrier 3 fixed to the vehicle;

clamping means comprising a cylinder 4 secured to the caliper 1 and exhibiting, facing the disk, an opening 4a closed by a piston 5;

guide means allowing a sliding of the caliper 1 with respect to the carrier 3 when the clamping means are actuated, these guide means comprising at least one guide pin such as 6, 7 fixed to one of the brake elements, and a blind bore such as 8, 9 formed in the other brake element and in which each guide pin slides; and two friction pads 10, 11 pointing toward opposite faces 2a, 2b of the disk, clamped between the piston 5 and one jaw 1a of the caliper 1, and applied to the disk when the clamping means are actuated.

Each guide pin such as 6 or 7, and the bore which corresponds to it, such as 8, 9, respectively constitute first and second guide members, each of which exhibits a front part, identified by an index "a", and a rear part identified by an index "p".

More precisely, the front part of each guide pin 6, 7 is formed by the free end of the latter, such as 6a, 7a, whereas the rear part of each guide pin 6, 7 is formed by the connected end of the latter, such as 6p, 7p.

The front part of each bore 8, 9 is formed by the opening of this bore, such as 8a, 9a, whereas the rear part of each bore 8, 9 is formed by the bottom of this bore, such as 8p, 9p.

Moreover, an elastically deformable annular sleeve 12, 13, adopting, for example, the shape of a bellows, and preferably totally leaktight, surrounds the opening 8a, 9a of each bore and the corresponding guide pin 6, 7.

According to the invention, represented in FIGS. 2 to 5, the rear part of at least one of the guide members which the caliper carries is further from the bottom of the cylinder than the front part of this guide member.

Figure 2:
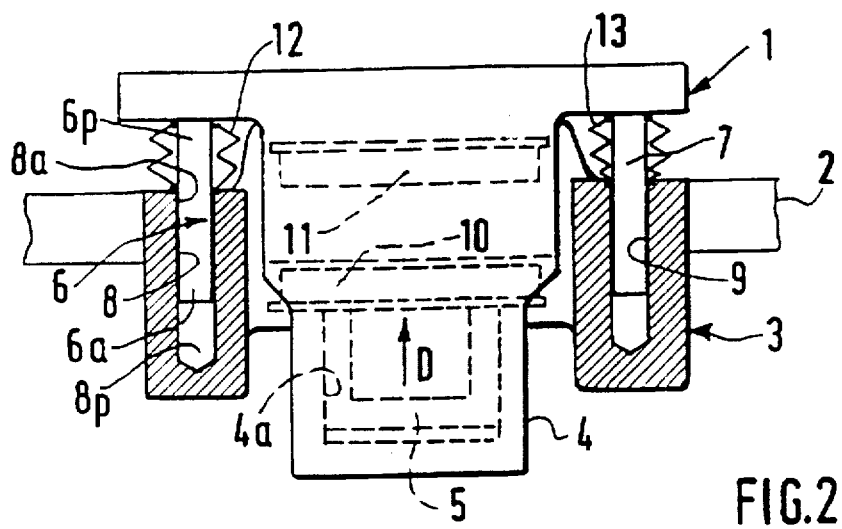
FIG. 2 is a diagrammatic and partial section view of a brake in accordance with a first embodiment of the invention.
Figure 4:
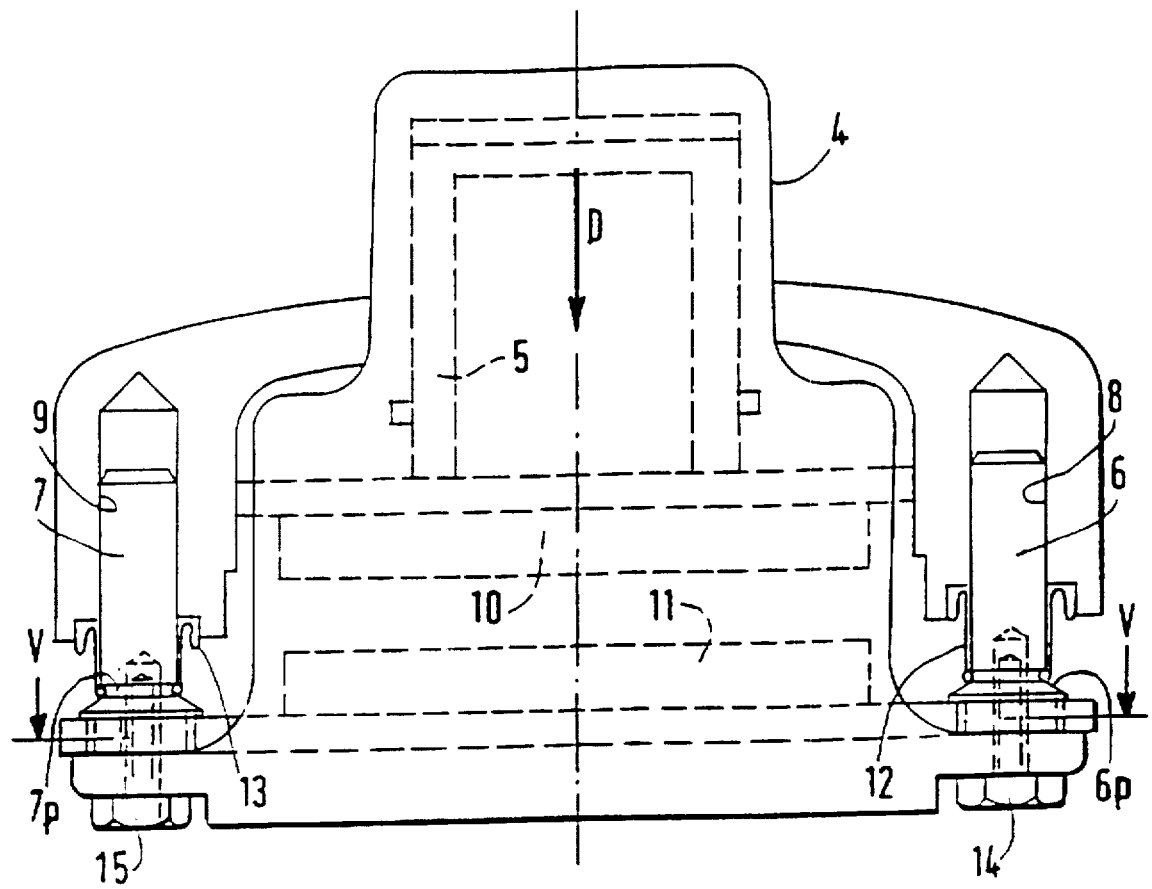
FIG. 4 is a view in diagrammatic section of a brake in accordance with a variant of the first embodiment.

For example, in FIGS. 2 and 4, in which the caliper carries two guide pins 6 and 7, the rear part 6p of the guide pin 6 is further from the bottom of the cylinder 4 than the front part 6a of this guide pin, the situation in this case being the same for the guide pin 7. Under these conditions, the opening 8a of the bore 8, pierced in the carrier 3, points in the same direction D as the opening 4a in the cylinder 4, the situation in this case being the same for the bore 9.

Figure 3:
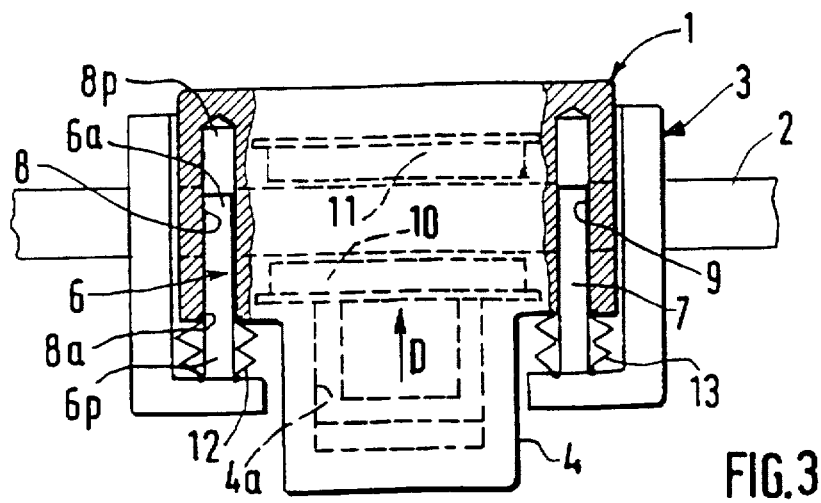
FIG. 3 is a diagrammatic and partial section view of a brake in accordance with a second embodiment of the invention.

In FIG. 3, in which the caliper is pierced with two guide bores 8 and 9, the rear part 8p of the bore 8 is further from the bottom of the cylinder 4 than the front part 8a of this bore, the situation in this case being the same for the bore 9. Under these conditions, the opening 8a in the bore 8 pierced in the caliper 1 points in an opposite direction from the direction D in which the opening 4a in the cylinder 4 points, the situation in this case being the same for the bore 9.

In all the embodiments, the air capable of escaping, for example, from the bore 8 when the pin 6 penetrates therein is at least partially contained inside the sleeve 12 such that air between end 6a of guide pin 6 and the rear part 8p of bore 8 is compressed on movement of the piston 5 toward the brake disk 2 in response to pressurized hydraulic fluid being supplied to cylinder 4 to effect a brake application. When the brake application terminates, the compressed air expands and returns the cylinder 4 to a rest position. The situation in this case being the same for the guide pin 7, the bore 9 and the sleeve 13.

By virtue of this layout, the air pushes the caliper back into its position of rest, whether this air be located in the bottom of the blind bore or inside the sleeve.

Figure 5:
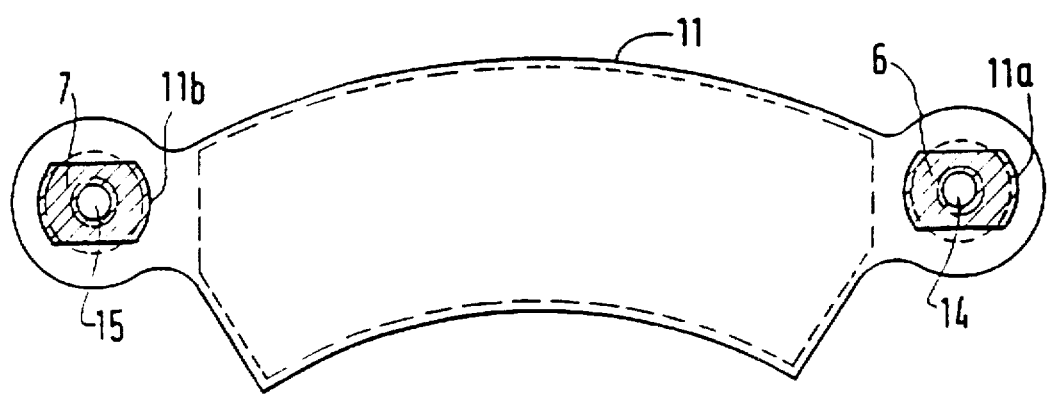
FIG. 5 is a view in section along the line V—V of FIG. 4.

FIGS. 4 and 5 illustrate an embodiment variant of the brake of FIG. 3.

In this variant, the pad 11 furthest from the piston 5 is directly supported by the caliper 1 and for this purpose exhibits oblong openings 11a, 11b in which are engaged, without the possibility of rotation, the ends 6p, 7p of the guide pins 6 and 7, the whole being held by means of screws 14, 15 fixing the caliper 1 and the pad 11 on these ends 6p, 7p.

By virtue of this layout, the pad 11 itself participates in the stiffness of the brake whilst replacing the outer part of the carrier.

Furthermore, the pad 11 prevents the rotation of the guide pins during clamping, and the whole allows easy dismantling of the caliper.

I claim:

1. A disk brake for use a motor vehicle, comprising:

first and second brake elements which can move one with respect to each other, said first brake element being a caliper which straddles a brake disk, said second brake element being a carrier which is fixed to a stationary member on said vehicle;

clamping means comprising a cylinder secured to said caliper, said clamping means having an opening facing said brake disk, said opening having a piston located therein and pointing in a first direction;

guide means for allowing said caliper to slide with respect to said carrier on actuation of said clamping means, said guide means comprising at least one guide pin fixed to one of said first and second brake elements and a blind bore formed in the other of said first and second brake elements, said at least one guide pin sliding in said blind bore, and an elastically deformable annular sleeve which surrounds an opening of said bore and said at least one guide pin, said at least one guide pin having a free end located in a rear part of said blind bore adjacent a bottom of the blind bore; and first and second friction pads pointing towards opposite first and second faces on said brake disk, said first and second friction pads being clamped between said piston and said caliper on actuation of said clamping means, characterized in that said at least one guide pin is carried by said carrier and in that said bore is pierced in said caliper, said bore having an opening pointed in a second direction opposite from the first direction such that air present in and capable of escaping from said bore is at least partially contained therein and compressed as said at least one guide pin moves toward said bottom of said blind bore on actuation of said clamping means, said compressed air on termination of said actuation of said clamping means expanding to move said caliper to a rest position.

* * * * *